United States Patent [19]

Schoofs

[11] 4,144,196

[45] Mar. 13, 1979

[54] ADSORBENT FOR USE IN DOUBLE GLAZED WINDOWS

[76] Inventor: Richard J. Schoofs, 1605 School St., P.O. Box 67, Moraga, Calif. 94556

[21] Appl. No.: 603,267

[22] Filed: Aug. 11, 1975

[51] Int. Cl.² .......................... B01J 29/06; E04B 2/28

[52] U.S. Cl. .................................... 252/455 Z; 52/788

[58] Field of Search ..................................... 252/455 Z

[56] References Cited

U.S. PATENT DOCUMENTS

| | | | |
|---|---|---|---|
| 2,970,968 | 2/1961 | Riordan et al. | 252/455Z |
| 3,006,153 | 10/1961 | Cook | 252/455 Z |
| 3,868,299 | 2/1975 | Ulisch et al. | 252/455 Z |

*Primary Examiner*—Carl Dees

*Attorney, Agent, or Firm*—Limbach, Limbach & Sutton

[57] ABSTRACT

An improvement in sealed insulating glass having an adsorbent disposed about all or part of the interior periphery of the glass is described. The improvement lies in employing a molecular sieve zeolite having an average pore diameter that permits adsorption of water vapor and prevents adsorption of nitrogen and oxygen as the adsorbent.

2 Claims, No Drawings

ADSORBENT FOR USE IN DOUBLE GLAZED WINDOWS

BACKGROUND OF THE INVENTION

Double glazed windows have been in use for some time as described in "Windows — Performance, Design and Installation" by Beckett and Godfrey, Van Nostrand Reinhold, New York (1974). A double glazed window consists of two parallel panes of glass which are spaced apart to leave an air spaced between the two panes and having the periphery of the space between the two panes closed by a moderately flexible sealant which extends between the two panes along their peripheries, holding them apart and enclosing a generally rectangular parallelepiped body of air between the two panes. Polybutene resins and polysulfide resins are commonly used as sealants in the construction of the double glazed windows.

The purpose of a double glazed window is to provide thermal insulation and insulation against noise. At the time of their writing, Beckett and Godfrey noted the problem of condensation of water vapor contained in the air in the space between the two panes when the temperature of the air space drops below its dew point and noted that, "In the context of windows, condensation can occur both on the surface of the glass and on the frame facing the room and with double windows, additionally within the cavity between the two glazings. Whenever it occurs, the results can be very troublesome, impairing the view out and leading to the deterioration of the paint work and window frames." They note also that dehydrating agents and desiccants such as silica gel may be placed in the cavity to adsorb moisture from the entrapped air and so contribute to the suppression of condensation.

Double glazed windows, commonly referred to as sealed insulating glass, commonly have a narrow body of solid adsorbent positioned in the space between the two panes and lying in close proximity to the sealing resin which both holds the two panes together and apart. The solid adsorbent is commonly held in a generally rectangular aluminum tube which is either perforated or not completely sealed so that the enclosed air may have contact with the adsorbent and this adsorbent may lie along all or part of the interior periphery of the sealed insulating glass.

Passage of time and acquisition of experience has shown that condensation of water vapor is not the sole condensation problem attending the use of double glazed windows but that additionally over a period of time some decomposition of organic sealants occurs releasing condensible vapors such as hydrocarbon vapors or organic sulfide vapors which may also condense on the interior surface of the glass panes. It is current practice to use as the adsorbent to suppress condensation, a synthetic zeolite, sometimes referred to as a molecular sieve, or silica gel, or activated alumina, or a mixture of synthetic zeolite and a second adsorbent such as silica gel. The use of a second adsorbent to supplement large pore molecular sieve adsorbents was based on the observation that the rapid adsorption of water vapor by the molecular sieve reduces its capacity for adsorption of hydrocarbon vapors or organic sulfides. The molecular sieves which have been employed have all had pore diameters of such size that nitrogen molecules and oxygen molecules as well as water vapor molecules were able to penetrate the pores of the adsorbent.

The use of molecular sieve zeolites of this character has given rise to a problem which appears not to have been recognized heretofore, but if it has been recognized, either it has been ignored or no solution for it has been proposed so far as is now known.

The relatively recent discovery of the "energy problem" portends a great increase in the use of double glazed windows going far beyond current use in predominantly glass covered skyscrapers and extending to extensive use in dwelling houses and apartments.

The seemingly certain large increase in the use of double glazed windows suggests that they be constructed to provide maximum efficiency and life and suggests that the problem which attends the use of adsorbents which adsorb not only water vapor but also nitrogen and oxygen can no longer be ignored.

The problem may be defined as follows. In the northern part of the temperate zone the temperature of the air enclosed between the two panes of a double glazed window may easily rise to 110° F. or above on a warm summer day and may fall to 0° F. or below on a cold winter night. At the lower temperatures in this range, the molecular sieve zeolites currently used adsorb not only water vapor but also adsorb substantial amounts of oxygen and nitrogen. At higher temperatures adsorbed oxygen and nitrogen tend to be released from the adsorbent and migrate back into the gas space enclosed between the two panes. The resultant cycles of adsorption and desorption with temperature variation, both day-night variation and seasonal variation, results in significant changes in the pressure of the air enclosed between the two panes. The pressure of the enclosed air may commonly vary by 6% or more merely as a result of adsorption or desorption of oxygen and nitrogen. This pressure variation is, of course, amplified by the affect of temperature. For example, with rising temperature, not only are nitrogen and oxygen desorbed from the molecular sieve zeolites now in use, but in addition the rise in temperature itself causes an increase in the pressure of the gas enclosed between the two relatively rigid panes. Conversely, with falling temperature, the adsorption of nitrogen and oxygen increases with a resultant lowering of the pressure of the gas in the space enclosed between the two panes and in addition, the lowering of the temperature itself causes a further reduction in the pressure of the enclosed gas. These continuing fluctuations in pressure cause some distortion of view through the double glazed windows and, further, these fluctuations cause a backward and forward movement of the panes themselves with a resultant tendency to weaken the seals between the two panes formed by the resins and ultimately to permit openings between the exterior air and the enclosed air through the sealing resin which permits the enclosed space to more or less breathe with the result that over a period of time capacity of the adsorbent to take up additional water vapor introduced through such breathing is exhausted.

BRIEF DESCRIPTION OF THE INVENTION

Pursuant to the present invention, the adsorbent which is disposed along the periphery of the space enclosed by the two panes of a double glazed window is a mixture of two adsorbents. One adsorbent is a molecular sieve zeolite which strongly adsorbs water vapor and which is characterized by an average pore diameter which permits entry of water vapor molecules into the pore spaces in the adsorbent and prevents entrance of nitrogen and oxygen molecules into this space. One specific adsorbent meeting these requirements is the 3A molecular sieve manufactured and sold by Union Carbide Corporation and by W. R. Grace & Co. This material has an average pore diameter in the range about 3 angstrom units, strongly and readily adsorbs water vapor and it does not adsorb either oxygen or nitrogen.

The chemical composition of this particular molecular sieve is indicated by the following formula:

$$K_9Na_3[(AlO_2)_{12}(SiO_2)_{12}] \cdot X\ H_2O$$

The water content of the composition varies with the degree of dryness or activation of the zeolite but in the desired activated state should not exceed about 1.5% of the weight of the total composition. Other adsorbents suitable for this use may be obtained by starting with a sodium zeolite having average pore diameter size about 4 angstrom units and displacing a substantial part of the sodium with potassium. The resultant potassium or partly potassium sieve has a reduced average pore diameter which permits entry of water vapor molecules into the pores and excludes oxygen and nitrogen molecules from the pores.

The second component of the adsorbent is either silica gel or activated alumina having average pore diameters which permit the adsorption of benzene vapor. Such a silica gel or activated alumina is placed in the air space between the panes of the double glazed window for the purpose of adsorbing hydrocarbon and/or organic sulfide vapors which get into the space enclosed between the two panes as a result of slow decomposition of the polysulfide or polyolefin resins which are used to seal the periphery of the double glazed window and which cause staining or discoloration of the interior surfaces of the panes unless they are promptly removed from the enclosed air space. Activated carbon will also function efficiently as a second adsorbent but because of its color more than usual care must be taken to confine it to the periphery of the interior space in the double glazed window. Mixtures of two or more of silica gel, activated alumina and activated carbon may be used as the second adsorbent if desired.

DETAILED DESCRIPTION OF THE INVENTION

Molecular sieve zeolites now generally referred to in the art as Type A molecular sieve zeolites are described in U.S. Pat. No. 2,882,243. Type A zeolites are described as truncated cube octahedrons having an internal central cavity or cage of 11A° diameter. The central cavities are entered through circular apertues of much smaller diameter, the diameter being determined by the specific cations contained. For instance, the Type 4A molecular zeolite has the formula $Na_{12}[(AlO_2)_{12}(SiO_2)_{12}] \cdot X\ H_2O$. When fully hydrated X is 27, but the sieve is activated to give it adsorbent capability by heating to drive the water of crystallization off until the water content of the total composition is reduced to 1.5% by weight or below. The Type 4A sieve has an aperture opening about 4Å in diameter. When a substantial proportion of the sodium content of the 4A sieve is replaced by potassium, the aperture diameter is reduced to about 3Å. For example, the Type 3A molecular sieve is formed by displacing sodium from the Type 4A sieve with potassium to reach the formula $K_9Na_3[(AlO_2)_{12}(SiO_2)_{12}] \cdot X\ H_2O$. The type 3A molecular sieve has aperture openings of 3Å diameter. Other molecular sieves such as Type 5A, Type 10X, Type 13X, etc. have larger aperture openings.

Directionally, the diameter of the aperture opening determines which molecules will be able to pass through the aperture opening into the central cage of the zeolite and so be adsorbed. It might be expected that the molecular sieve having aperture openings of 4Å would permit entry of molecules having a kinetic diameter less than 4Å and exclude from entry into the central cavity molecules having kinetic diameters greater than 4Å. The matter of entry and exclusion, however, is not quite that simple. Breck and Smith writing in *Scientific American,* January 1959, note, "One might expect that molecules more than a 3.5 angstrom in diameter would be unable to enter the crystals (of a Type A sieve having aperture diameters of 3.5 angstroms) but the reality is not quite so simple. We find, for example, that ethane molecules with a diameter of 4 angstrom units readily pass through the 3.5 angstrom apertures at normal temperatures; propane molecules 4.9 angstrom units in diameter do not. The reason becomes clear enough when we recall that atoms are not rigid bodies. They more nearly resemble pulsating rubber balls. The pulsations of both the aperture atoms and the incoming molecules combine to make the effective diameter of the aperture considerably larger than its free diameter of 3.5 angstroms. Moreover, the kinetic energy of the incoming molecules helps them to 'shoulder their way' through the opening. We have found in general that at ordinary temperatures molecules up to 0.5 angstroms wider than the free diameter of the aperture can pass through it easily. Larger molecules enter the crystal with greater and greater difficulty; molecules 1 angstrom wider cannot enter at all."

The quoted material above indicates the difficulty of defining a molecular sieve zeolite which will admit certain molecules and exclude others in terms of aperture diameter and kinetic diameter of the molecules. In order to know whether a molecular sieve having a given aperture diameter will admit or exclude molecules having a kinetic diameter greater than the aperture opening but not more than 1 angstrom greater, it is necessary to make a simple test by exposing the molecular sieve to the materials with which it may be hoped will be excluded and determine whether or not they are admitted or excluded.

The Type 3A molecular sieve admits and adsorbs water molecules and excludes oxygen molecules and nitrogen molecules. The minimum kinetic diameter of a water molecule has been reported at 2.65Å and the minumum kinetic diameters of oxygen and nitrogen molecules, respectively, at 3.46 and 3.64Å. To determine whether a molecular sieve prepared by displacing part of the sodium from a 4A sieve with potassium will admit or exclude nitrogen and oxygen requires a simple test of this sort if less than half of the sodium has been displaced.

Adsorbents for use in double glazed windows to control condensation of water vapor and of hydrocarbons or organic sulfides on the interior surfaces of the panes may be prepared by mixing Type 3A molecular sieve zeolite with either a silica gel adsorbent or an activated alumina adsorbent having pore diameters sufficiently large to permit the adsorption of benzene molecules.

These adsorbent mixtures should contain a minimum of about 15% by weight of the Type 3A molecular sieve zeolite and a minimum of about 25% by weight of silica gel or activated alumina. Both adsorbents are in the form of small particles having a mesh size generally in the range 10 to 30. The mesh size of the particles is not critical but sizes in this range facilitate filling the perforated aluminum tubes which are laid along the interior periphery of the double glazed window.

The quantity of the adsorbent mixture theoretically required to control water vapor condensation and hydrocarbon condensation is quite small being somewhat less than 7 grams for a 3 foot by 5 foot double glazed window having a one-half inch space between the panes. Because, however, minor imperfections in the sealing of the two panes of double glazed windows are unavoidable in a fair proportion of them which permits migration of water vapor from the outside air into the interior space, because hydrocarbon or organic sulfide release is more rapid during the curing of the resin and prompt removal of these vapors is necessary to avoid staining of the interior surface, and because consumers are demanding extended warranties on the life of double glazed windows, the quantity of adsorbent disposed along the periphery of the interior space should be a quantity in the range about 0.01 gram to 1.0 gram of adsorbent for each cubic inch of space enclosed between the two panes, larger amounts may be used if desired but ordinarily no benefit attends the use of larger amounts.

While it is preferred to use a mixture of particulate molecular sieve zeolite with particulate silica gel, activated alumina or activated carbon, effective suppression of condensation with simultaneous avoidance of pressure fluctuations due to nitrogen and oxygen adsorption and desorption may be achieved by filling some rectangular aluminum tubes with the molecular sieve zeolite and others with the second adsorbent and then placing zeolite filled tubes along one or more peripheral sides of the space enclosed between the two panes and tubes filled with the second adsorbent along one or more of the remaining peripheral sides. Additionally, the filling of the rectangular aluminum tubes may be carried out not only by pouring granular adsorbent into the tubes but also, if desired, the adsorbents may be compressed into rod-like shape sized to slide into the aluminum tubes.

While the greater proportion of the double glazed windows now manufactured employ the combination of polyolefin or polysulfide resins and adsorbent filled aluminum tubes to maintain spacing between the two panes and seal the periphery of the space enclosed between the panes, some double glazed windows are manufactured using lead strips and an adhesive to close the space between the panes and maintain the spacing between them. In such windows, the second adsorbent is not required because there are no resin decomposition products to contend with, only a zeolite molecular sieve adsorbent capable of adsorbing water vapor and incapable of adsorbing nitrogen and oxygen need be used. In this type of double glazed window, from about 0.01 to 0.6 grams of adsorbent per cubic inch of enclosed space adequately suppress water vapor condensation.

What is claimed is:

1. An adsorbent for use in sealed insulated glass to prevent condensation on the interior surfaces of the insulating glass consisting essentially of a mixture of a particulate molecular sieve zeolite having an average pore diameter which permits entry of water molecules into the pore space and prevents entry of nitrogen and oxygen into the pore space and a particulate non-zeolitic adsorbent having a strong affinity for hydrocarbon adsorption and an average pore diameter which permits entry of benzene molecules into the pore space.

2. The adsorbent mixture defined in claim 1 wherein the mixture consists essentially of 15 to 75% by weight of Type 3A molecular sieve zeolite and the remainder is silica gel or activated alumina and wherein both components of the mixture are particles within the range about 10 to 30 mesh.

* * * * *